United States Patent

Cho et al.

Patent Number: 5,699,199
Date of Patent: Dec. 16, 1997

[54] ZOOM LENS WITH HINDERING DEVICE

[75] Inventors: Michio Cho; Masashi Takamura; Yoichi Iwasaki, all of Saitama, Japan

[73] Assignee: Fuji Photo Film Co., Ltd., Kanagawa, Japan

[21] Appl. No.: 690,141

[22] Filed: Jul. 31, 1996

[30] Foreign Application Priority Data

Aug. 1, 1995 [JP] Japan .................. 7-196243

[51] Int. Cl.$^6$ .................. G02B 15/14
[52] U.S. Cl. .................. 359/698; 359/696; 359/702
[58] Field of Search .................. 359/694, 696, 359/698, 699, 700, 702, 704

[56] References Cited

U.S. PATENT DOCUMENTS 5,546,238  8/1996  Devenyi .................. 359/823

FOREIGN PATENT DOCUMENTS

6-100707  12/1994  Japan .................. G02B 7/10

*Primary Examiner*—David C. Nelms
*Assistant Examiner*—John P. Cornely
*Attorney, Agent, or Firm*—Sughrue,Mion,Zinn,Macpeak & Seas, PLLC

[57] ABSTRACT

A zoom lens is comprised of a fixed barrel, an intermediate barrel coupled to the fixed barrel through helicoid screws, a movable barrel coupled to the intermediate barrel through helicoid screws, a front lens group fixedly held in the movable barrel, and a rear lens group. The position of the front lens group in the optical axis direction is always determined by the axial movement of the intermediate barrel relative to the fixed barrel and the axial movement of the movable barrel relative to the intermediate barrel. The axial position of the rear lens group is determined by the axial movement of the intermediate barrel relative to the fixed barrel and a cam surface formed in an inner periphery of the intermediate barrel. As the axial position of the cam surface within the intermediate barrel changes with the rotational position of the intermediate barrel, the rear lens group moves in the axial direction relative to the intermediate barrel during zooming. But during focusing, a hindering device is activated to hinder the rear lens group from axial movement relative to the intermediate barrel, so that the rear lens group moves by the same amount in the axial direction as the intermediate barrel independently of the cam surface.

11 Claims, 11 Drawing Sheets

ZOOM LENS WITH HINDERING DEVICE

BACKGROUND OF THE INVENTION

1. Field of the Invention

The present invention relates to a zoom lens which is driven by a single lens driving device or motor to make zooming and focusing.

2. Background Art

JPB 6-100707 discloses a zoom lens which uses a single lens drive motor to make zooming and focusing. The zoom lens is mainly constituted of a zoom ring, two lens groups, and the motor which drives the zoom ring to rotate. In an inner periphery of the zoom ring, a first cam groove is provided for guiding the two lens groups to move relative to each other for zooming. Also second cam grooves are formed in the inner periphery of the zoom ring, for guiding the lens groups to follow different courses from the first cam groove, for focusing. The second cam grooves are alternately disposed in the same line as the first cam groove, such that a focusing position is determined in relation to each zooming position, in accordance with the rotational angle of the zoom ring rotated by the motor. In this type of zoom lens, the courses of the lens groups are sectioned into a first zooming position, a focusing range for the first zooming position, a second zooming position, a focusing range for the second zooming position, and so on, in this sequence. Therefore, zooming cannot be made continuously. Moreover, since the courses of the lens groups in the focusing ranges are different from those for the zooming, it is necessary to return the lens group from the focusing course to the next zooming position on the zooming course. Additional cam grooves necessary for this returning movement complicate the configuration of cam grooves and thus rise the cost of the zoom lens.

OBJECT OF THE INVENTION

In view of the foregoing, a prime object of the present invention is to provide a zoom lens which is driven by a single lens driving device and permits a continuous zooming with simple guide members for guiding the lens groups and thus at a low cost.

SUMMARY OF THE INVENTION

To achieve the above and other objects, the present invention provides a hindering device in a zoom lens having at least two lens groups and a single lens driving device such as a motor. The hindering device is activated during focusing to hinder a first one of the two lens groups from axial movement relative to a camera body or a first lens barrel portion which moves differently from a second one of the two lens groups.

For zooming, the two lens groups are moved by the lens driving device to follow respective zooming courses, while the hindering device is not activated. For focusing, because the hindering device is activated, the first lens group moves off its zooming course, while the second lens groups moves on the same course as its zooming course.

According to this configuration, there is no need for providing complicated cam grooves.

The hindering device may be a brake member which secures the first lens group to the first lens barrel portion or the camera body, when actuated by an actuator, such as an electromagnetic solenoid.

According to a preferred embodiment, the first lens group is adapted to move along a cam surface during zooming. And, during focusing, by virtue of the hindering device, the first lens group is removed from the cam surface in cooperation with the movement of the first lens barrel portion.

According to another preferred embodiment, the first and second lens groups are moved through a plurality of drive shafts which are driven by the lens driving device through a power transmission mechanism. The hindering device is connected in the power transmission mechanism so as to disconnect one of the two lens groups from the lens driving device during focusing.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENTS

Figure 1:
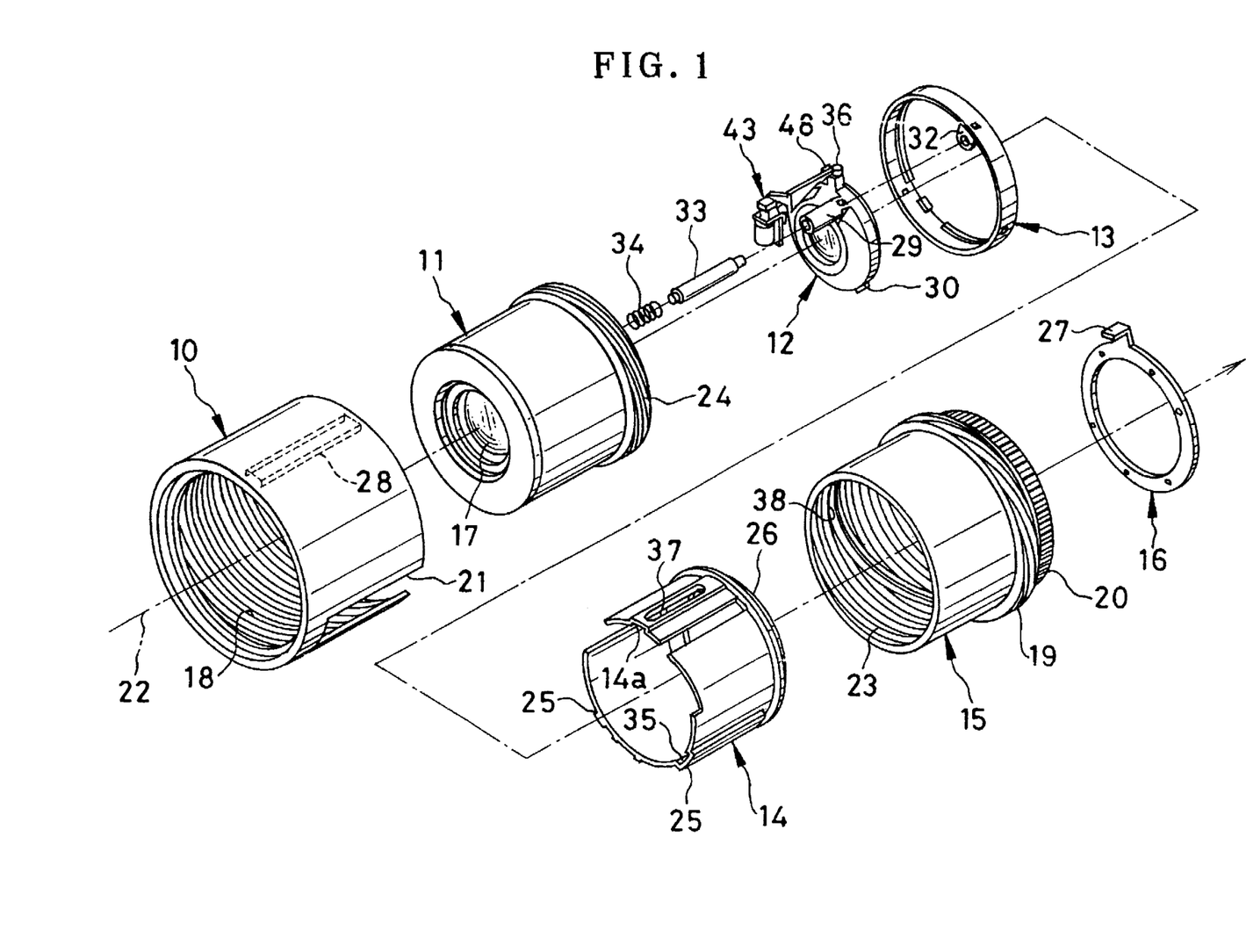
FIG. 1 is an exploded perspective view of a zoom lens according to a preferred embodiment of the invention.

In FIG. 1, a zoom lens according to the present invention is constituted of a fixed barrel 10, a movable barrel 11, a rear lens frame 12, a holder ring 13, a linear motion barrel 14, an intermediate barrel 15 and a stopper ring 16. A front lens group 17 is securely held in the movable barrel 11.

Figure 2:
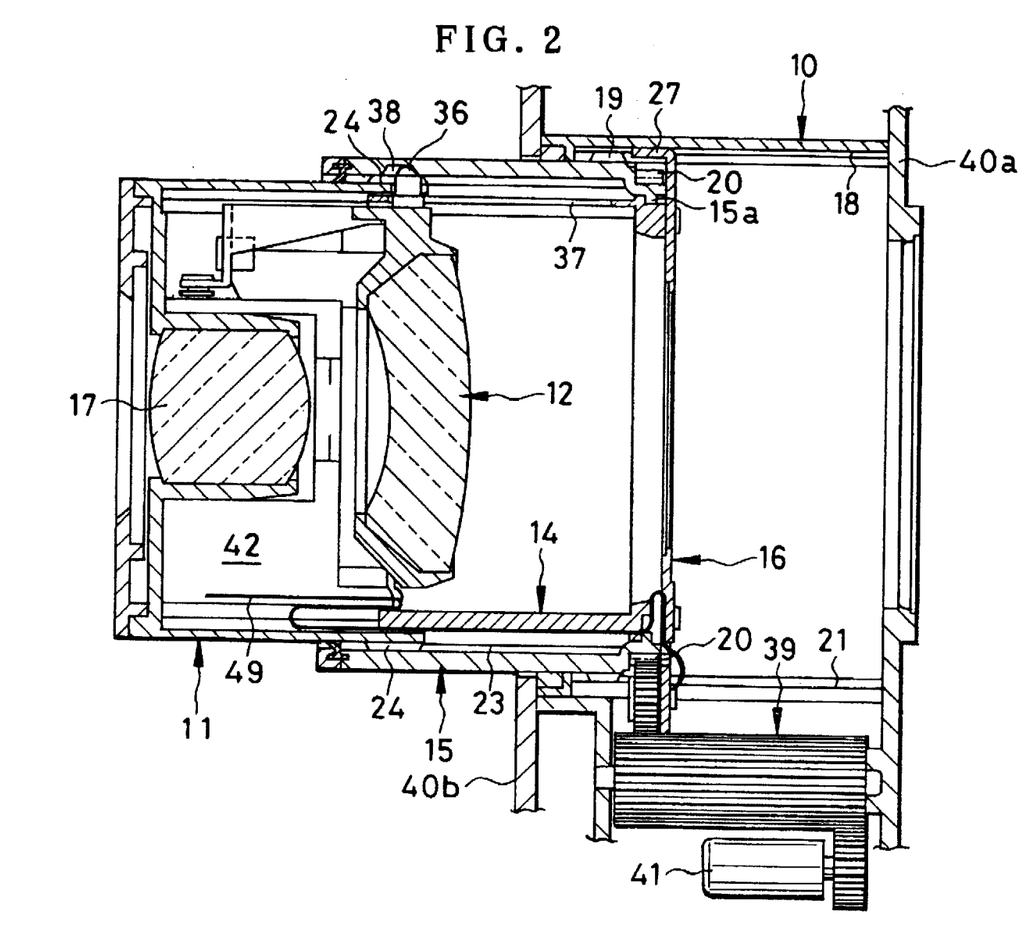
FIG. 2 is an axial section of the zoom lens of the embodiment shown in FIG. 1, showing a relationship between a cam follower pin of a rear lens frame and a cam groove of an intermediate barrel.

The fixed barrel 10 has a helicoid screw 18 on an inner periphery thereof. The intermediate barrel 15 has a helicoid screw 19 formed on an outer periphery proximate a trailing end thereof, so that the intermediate barrel 15 is held in the fixed barrel 10 with its helicoid screw 19 in mesh with the helicoid screw 18 of the fixed barrel 10. The intermediate barrel 15 is movable back and forth along an optical axis 22 of the zoom lens, while rotating within the fixed barrel 10, in accordance with the lead of the helicoid screws 18 and 19. A gear 20 is formed around the outer periphery of the trailing end of the intermediate barrel 15, and an axial slit 21 is formed through the fixed barrel 10 to give a power transmission mechanism 39 access to the gear 20 of the intermediate barrel 15, so that the intermediate barrel 15 may be rotated by a driving power from a motor 41, as shown in FIG. 2. The fixed barrel 10 is secured to a camera body 40a. Designated by 40b is a front cover of the camera. A shutter unit 42 is incorporated into the movable barrel 11, and the reference number 49 designates a lead wire.

The intermediate barrel 15 also has a helicoid screw 23 on an inner periphery thereof, and the movable barrel 11 has a helicoid screw 24 on an outer periphery of a trailing end thereof, so that the movable barrel 11 is held in the intermediate barrel 15 with its helicoid screw 23 in mesh with the helicoid screw 24. The magnitude of movement of the movable barrel 11 is defined by the movement of the intermediate barrel 15 and the lead of helicoid screws 23 and 24. The movable barrel 11 has a plurality of axial grooves on an inner periphery thereof, with which axial ridges 25 of the linear motion barrel 14 are engaged when the linear motion barrel 14 is mounted in the movable barrel 11.

A trailing end 26 of the linear motion barrel 14 is secured to the stopper ring 16 at a trailing end of the intermediate barrel 15, such that an annular ridge 15a formed around the inner surface of the trailing end of the intermediate barrel 15 is sandwiched between the linear motion barrel 14 and the stopper ring 16. Thereby, the linear motion barrel 14 can rotate with the stopper ring 16 relative to the intermediate barrel 15. The stopper ring 16 is formed with a guide hook 27 which projects radially from the stopper ring 16 and bends toward the intermediate barrel 15. The guide hook 27 is engaged in an axial inner groove 28 of the fixed barrel 10, so that the linear motion barrel 14 and the movable barrel 11 cannot rotate relative to the fixed barrel 10.

Figure 3:
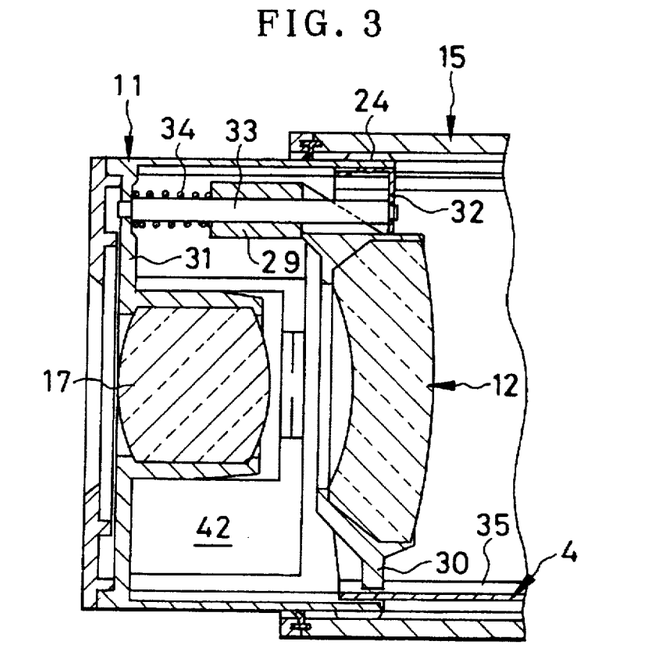
FIG. 3 is an axial section of the zoom lens of FIG. 1, showing a relationship between a guide rod and the rear lens frame.

As shown in detail in FIG. 3, a supporting member 29 and an anti-rotation member 30 are formed integrally with the rear lens frame 12. In the supporting member 29 is inserted a guide rod 33 which extends in the optical axis direction 22 between a front wall 31 of the movable barrel 11 and a holding tab 32 of the holder ring 13. A coil spring 34 is fitted on the guide rod 33 between the supporting member 29 and the front wall 31, to urge the rear lens frame 12 axially rearward. The anti-rotation member 30 is engaged in an axial inner groove 35 of the linear motion barrel 14, so that the rear lens frame 12 is movable in the movable barrel 11 along the guide rod 33 without being rotated relative to the movable barrel 11 as well as the linear motion barrel 14. The holder ring 13 is secured to the trailing end of the movable barrel 11.

Figure 4:
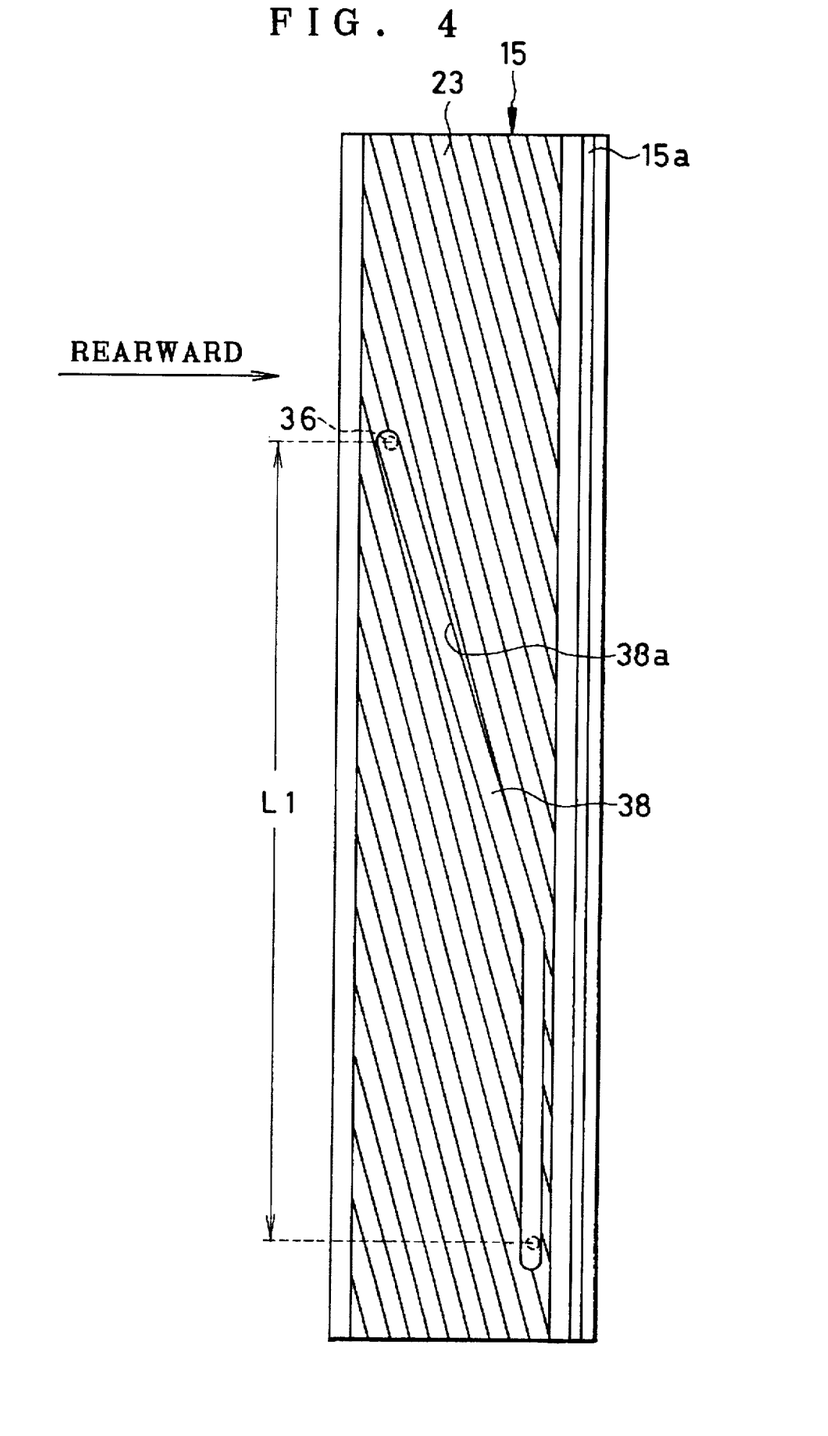
FIG. 4 is an unfolded view showing an inner periphery of the intermediate barrel with the cam groove in relation to the cam follower pin.
Figure 5:
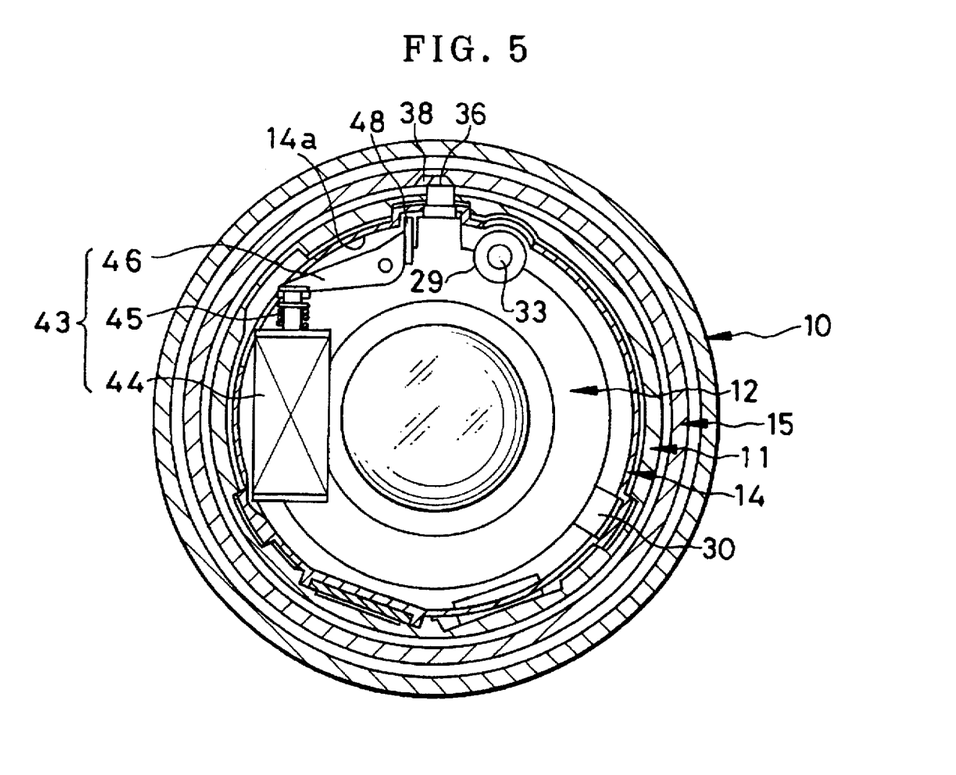
FIG. 5 is a radial section of the zoom lens of FIG. 1, showing a brake member attached as a hindering device to the rear lens frame.

The rear lens frame 12 further has a cam follower pin 36, which protrudes radially from the rear lens frame 12 through an axial slot 37 of the linear motion barrel 14, to be engaged in a cam groove 38 formed in the inner periphery of the intermediate barrel 15, as shown in detail in FIGS. 2, 4 and 5. Thus, the rear lens frame 12 moves back and forth in the optical axis direction 22 along the guide rod 33 in cooperation with the intermediate barrel 15. Referring to FIG. 4 showing the unfolded view of the intermediate barrel 15, the cam groove 38 has a helicoid portion, so that the axial position (i.e. the position in the optical axis direction 22) of the cam groove 38 within the intermediate barrel 15 changes with the rotational position of the intermediate barrel 15. Accordingly, the axial position of the cam follower pin 36 and thus that of the rear lens frame 12 change in accordance with the axial movement of the intermediate barrel 15 and the axial position of the cam groove 38 within the intermediate barrel 15.

Figure 6:
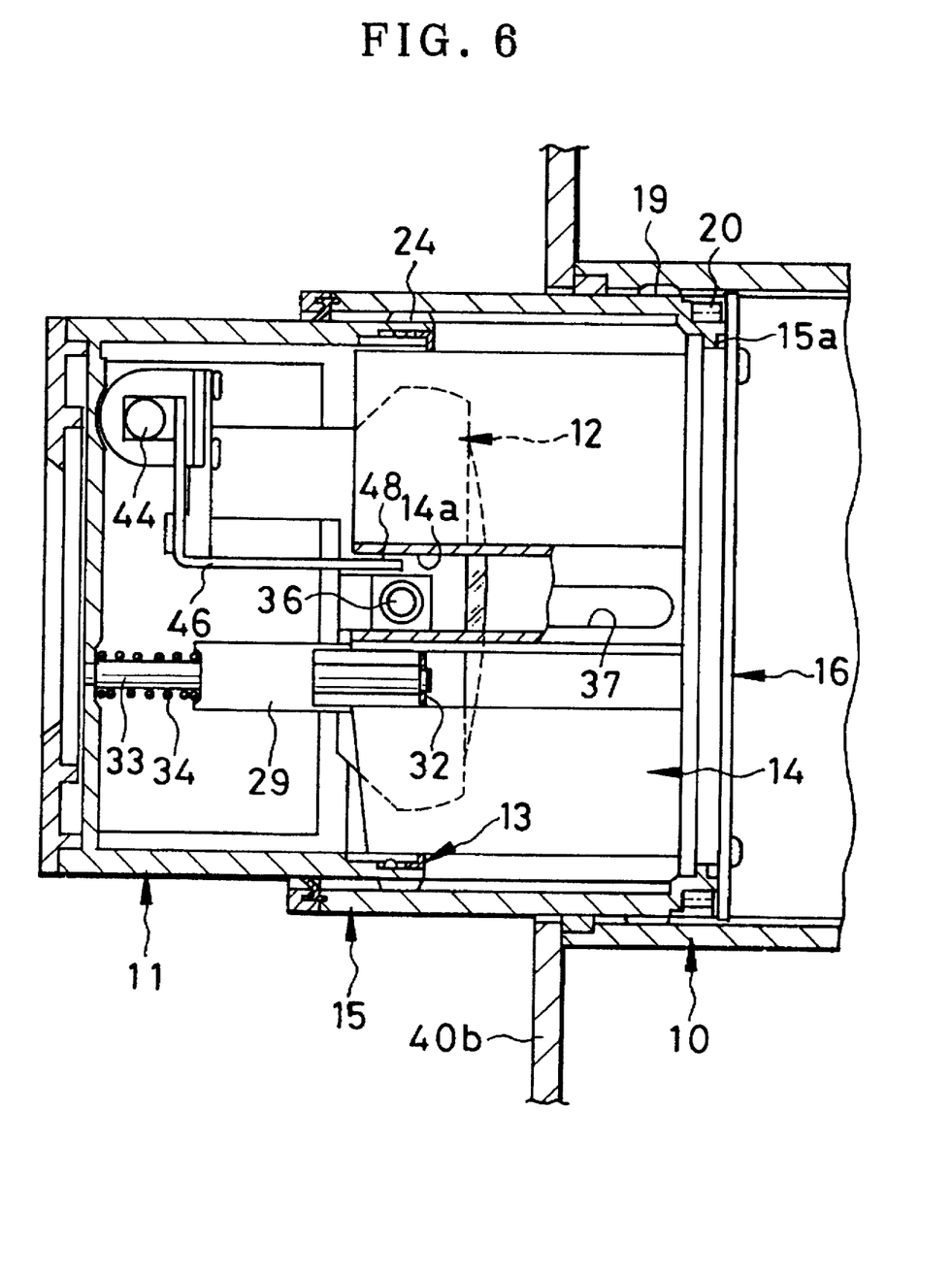
FIG. 6 is an explanatory view, partly in section, showing the relationship between the brake member and a linear motion barrel.

During zooming, the cam follower pin 36 slides along the cam groove 38 in a range L1, as shown in FIG. 4. The cam follower pin 36 is urged into contact with a side wall 38a of the cam groove 38, which is hereinafter referred to as a cam surface 38a, under the force of the spring 34 which urges the rear lens frame 12 rearward. So the rear lens frame 12 is moved along the cam surface 38a during the zooming. During focusing, on the other hand, when a brake member 43 is actuated the cam follower pin 36 is removed from the cam surface 38a in response to a reverse rotation of the motor 41, as will be described in detail below. To permit disconnection of the cam follower pin 36 from the cam surface 38a, the cam groove 38 has a wider width than the diameter of the cam follower pin 36. The brake member 43 is attached to the rear lens frame 12 as a hindering device for hindering the rear lens frame 12 from moving relative to the intermediate barrel 15 during the focusing. As the intermediate barrel 15 moves in a different way from the front lens group 17 during the focusing, the rear lens frame 12 also moves differently from the front lens group 17 during the focusing. The brake member 43 is constituted of a solenoid 44, a spring 45, a brake lever 46 and a brake pad 48 which is secured to a distal end of the brake lever 46. The spring 45 urges the brake lever 46 to rotate in a direction to remove the brake pad 48 away from an inner surface 14a of the linear motion barrel 14. When the solenoid 44 is activated, the brake lever 46 rotates against the force of the spring 45 to press the brake pad 48 onto the inner surface 14a, so that the rear lens frame 12 is secured to the linear motion barrel 14. Because the linear motion barrel 14 moves along with the intermediate barrel 15, the rear lens frame 12 is thus prevented from moving relative to the intermediate barrel 15 during the focusing.

Figure 7:
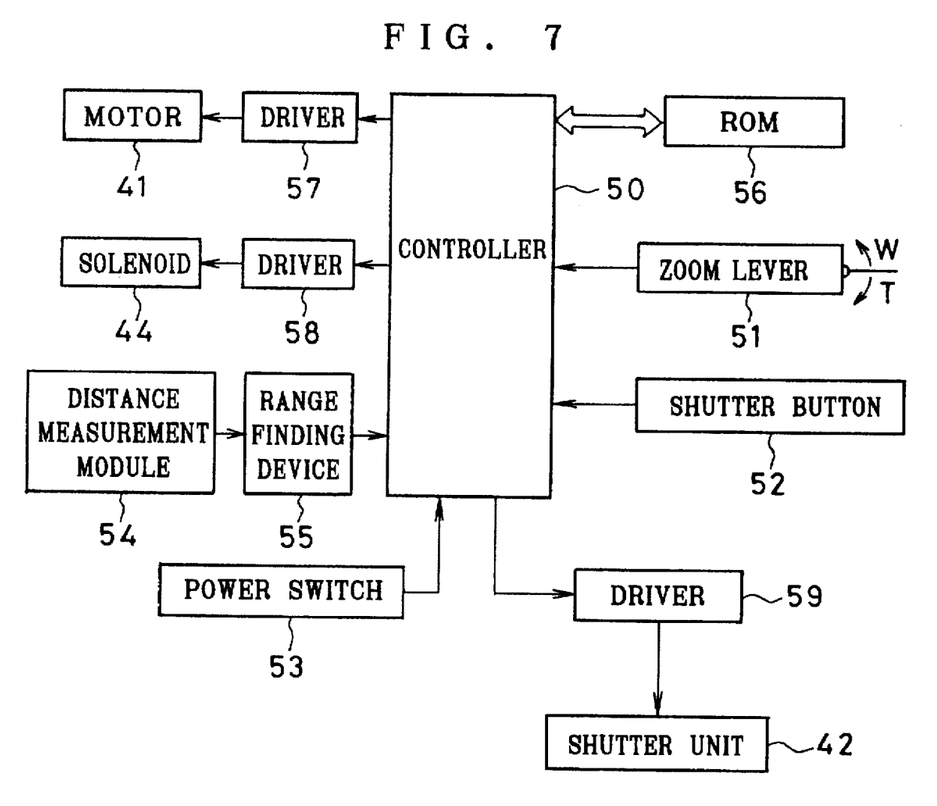
FIG. 7 is a block diagram showing the electric construction of a camera having the zoom lens of FIG. 1.

FIG. 7 shows an electric system of the camera, wherein a controller 50 controls the motor 41, the solenoid 44, the shutter unit 42 through respective drivers 57, 58 and 59, in accordance with a program sequence and data previously written in ROM 56, as well as control signals entered through a zoom lever 51, a shutter button 52, a power switch 53 and so forth, and a subject distance signal which is obtained from a range finding device 55 through a distance measurement module 54. The motor 41 is driven during zooming and focusing in a manner as set forth below.

Figure 8:
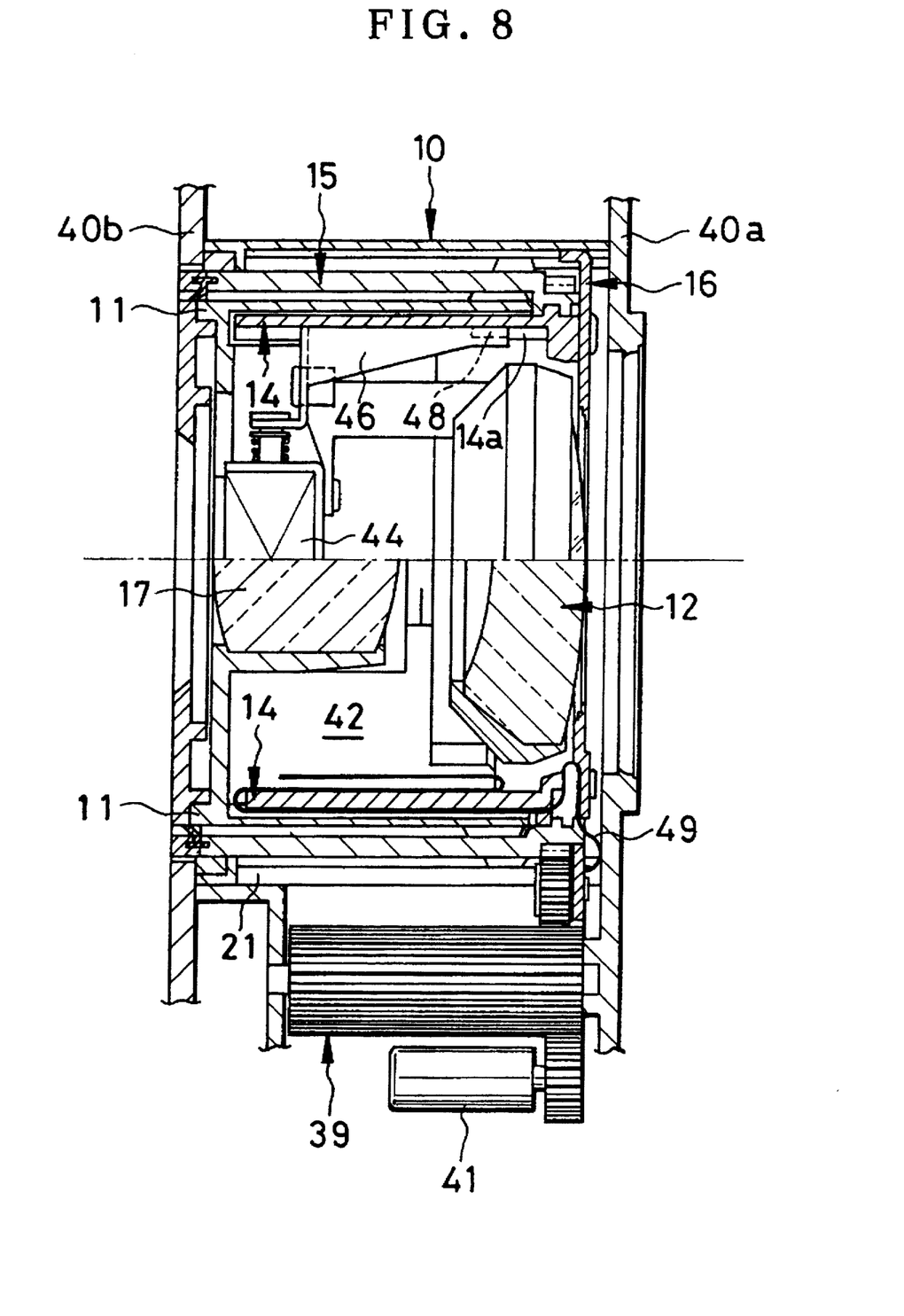
FIG. 8 is an axial section of the zoom lens of FIG. 1 in its rest position.
Figure 9:
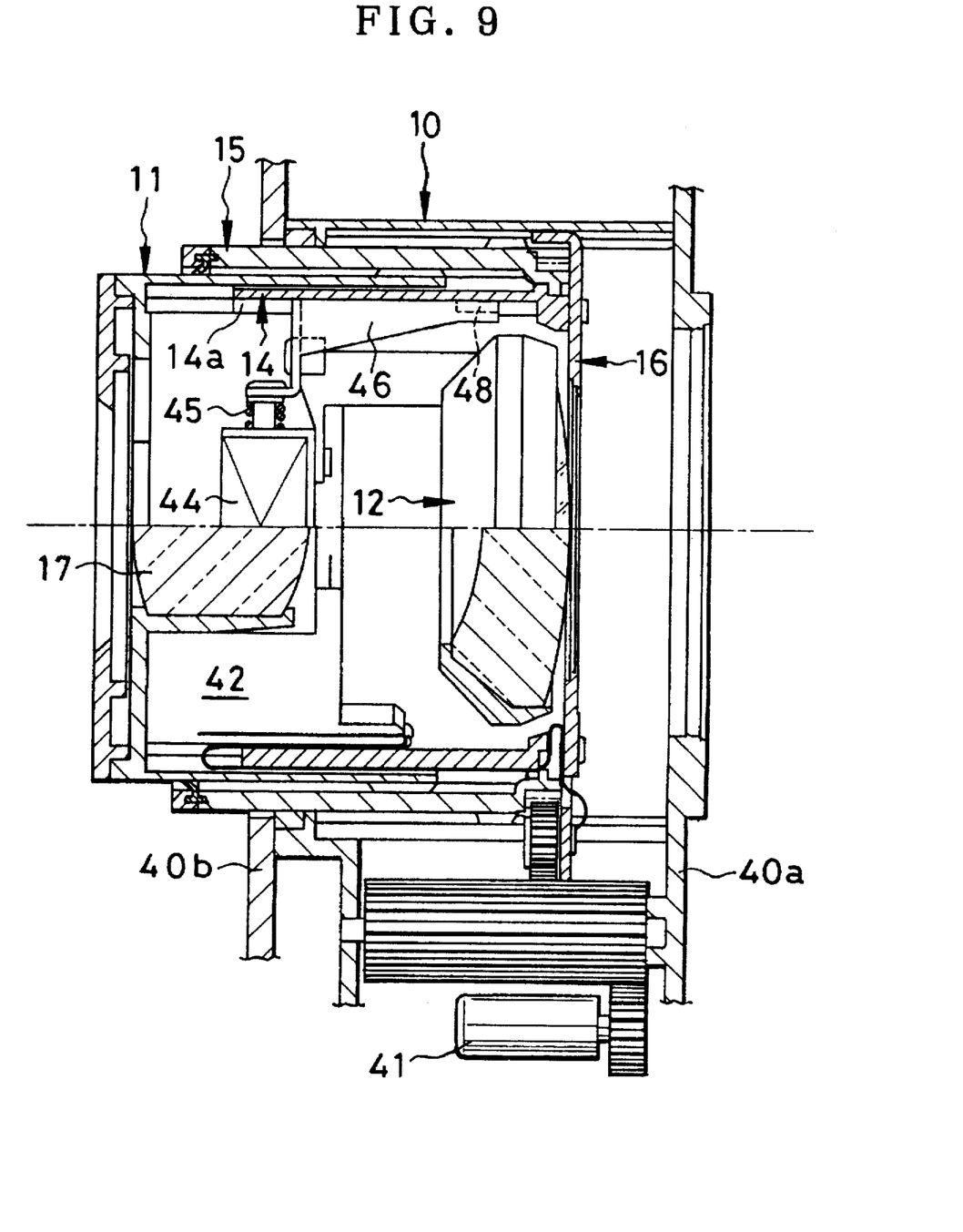
FIG. 9 is an axial section of the zoom lens of FIG. 1 in its wide-angle position.
Figure 10:
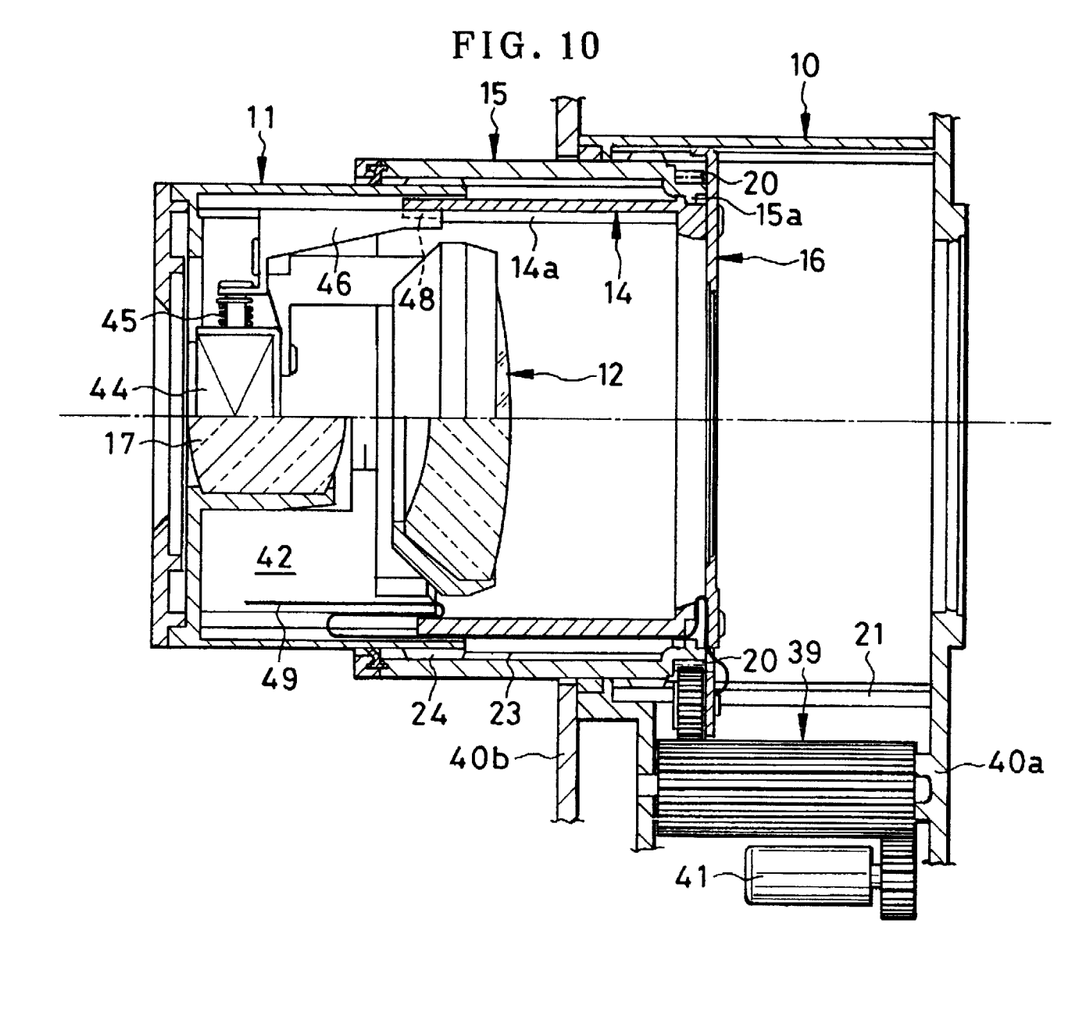
FIG. 10 is an axial section of the zoom lens of FIG. 1 in its telephoto position.

When the power switch 53 is turned ON, the controller 50 drives the motor 41 to rotate forward. Thereby, the zoom lens moves from a rest position shown in FIG. 8 to a wide-angle position shown in FIG. 9. Thereafter, in accordance with a zooming signal from the zoom lever 51, the motor 41 is rotated forward and backward to move the zoom lens between the wide-angle position and the telephoto position shown in FIG. 10.

For example, when the zoom lever 51 is operated toward the telephoto position, the controller 50 rotates the motor 41 forward, so the zoom lens moves forward in the optical axis direction 22 that is toward the telephoto position. Specifically, the forward rotation of the motor 41 is transmitted through the transmission mechanism 39 to the intermediate barrel 15, so that the intermediate barrel 15 is rotated to move forward in accordance with the lead of the helicoid screws 18 and 19. With the forward rotation of the intermediate barrel 15, the movable barrel 11 moves forward in accordance with the lead of the helicoid screws 23 and 24, since the stopper ring 16 and the linear motion barrel 14 stop the relative rotation of the movable barrel 11 to the fixed barrel 10. The rear lens frame 12 moves forward, without being rotated, in accordance with the axial position of the cam surface 38a within the intermediate barrel 15 which changes with the rotational position of the intermediate barrel 15.

Figure 11:
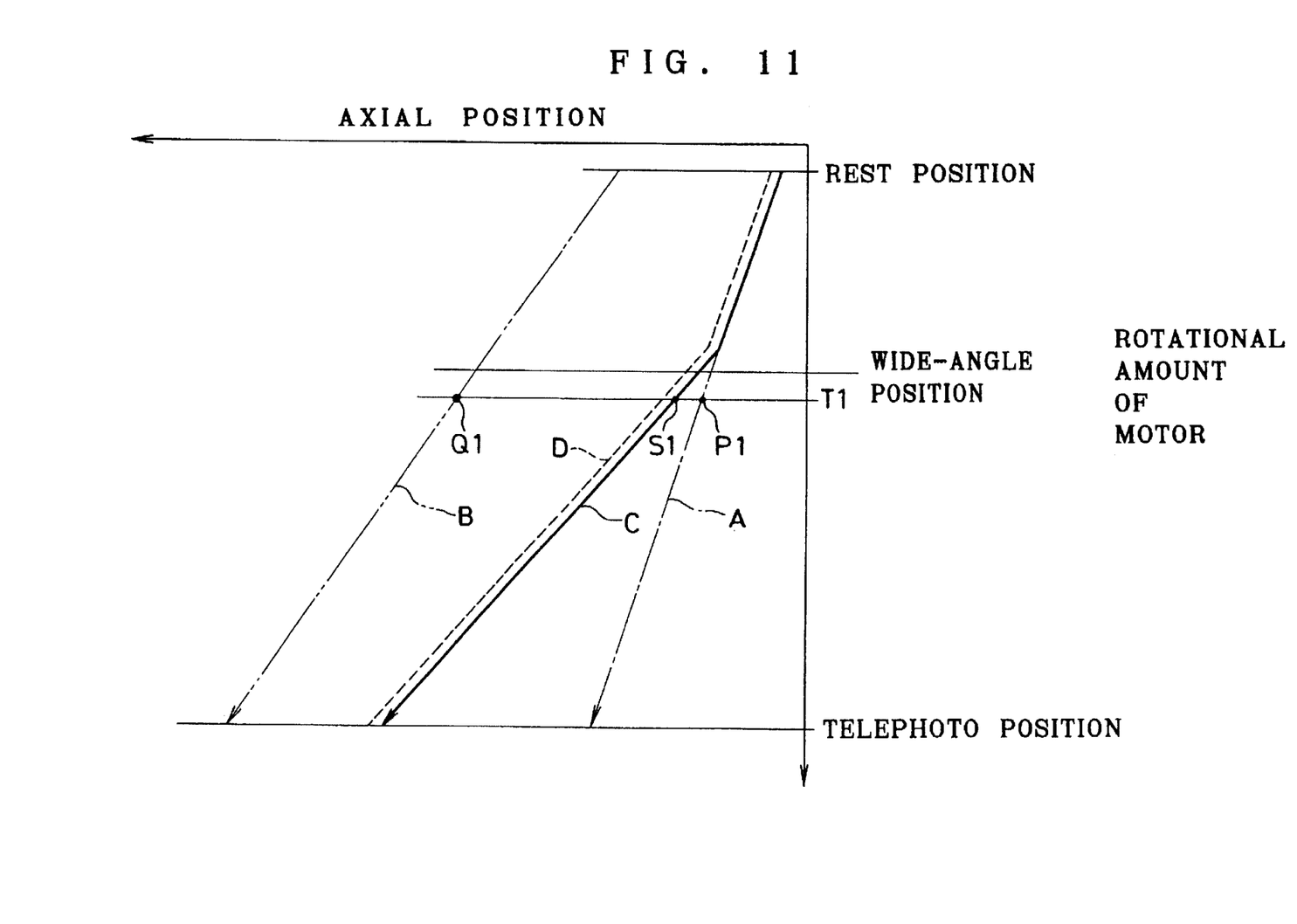
FIG. 11 is a diagram showing respective courses of the rear lens group, the intermediate barrel and a front lens group during zooming of the zoom lens of FIG. 1.

Because the amount of movement of the intermediate barrel 15 in the optical axis direction 22 is dependent upon the lead of the helicoid screws 18 and 19, the axial position of the intermediate barrel 15 is proportional to the rotational amount of the motor 41, as shown by a curve A in FIG. 11. And the intermediate barrel 15 reaches a zooming position P1 when the motor 41 rotates by an amount T1 from the rest position. On the other hand, because the axial position of the movable barrel 11 with the front lens group 17 is dependent upon the axial position of the intermediate barrel 15 and the lead of the helicoid screws 23 and 24 in combination, the movable barrel 11 and the front lens group 17 move along a curve B which has a different inclination from the curve A, as shown in FIG. 11. Therefore, responsive to the same rotational amount T1 of the motor 41, the front lens group 17 reaches a zooming position Q1.

The axial position of the rear lens frame 12 is dependent upon the axial position of the intermediate barrel 15 and that of the cam surface 38a within the intermediate barrel 15, so that the course of the rear lens frame 12 is given by a curve C in FIG. 11. The curve C overlaps the curve A in a range from the rest position to a position shortly before the wide-angle position because the axial position of the cam groove 38 within the intermediate barrel 15 is unchanged in this range. Thereafter, in accordance with the change in the axial position of the cam groove 38 within the intermediate barrel 15, the curve C has a different inclination from the curve A. Thus, responsive to the rotational amount T1 of the motor 41, the rear lens group 12 reaches a zooming position S1.

When the shutter button 52 is depressed halfway, the controller 50 activates the distance measurement module 54 to measure the subject distance, and detects digital data of the subject distance from the range finding device 55. The subject distance data is rewritten in the controller 50 upon each distance measurement.

When the shutter button 52 is fully depressed, the controller 50 reads out the subject distance data to focus the zoom lens on the subject distance. For focusing, first the solenoid 44 is activated through the driver 58, so that the brake lever 46 rotates to press the brake pad 48 onto the inner surface 49 of the linear motion barrel 14. Thus, the rear lens frame 12 is secured to the intermediate barrel 15 through the linear motion barrel 14.

Thereafter, the motor 41 is driven through the driver 57 to rotate reversely. The reverse rotation of the motor 41 causes the zoom lens to move rearward, i.e., in the direction from the telephoto position to the wide-angle position. The amount of rearward movement is determined by focusing data which is read from the ROM 56 based on the subject distance data and the zooming signal that represents the magnification or focal length of the zoom lens.

Figure 12:
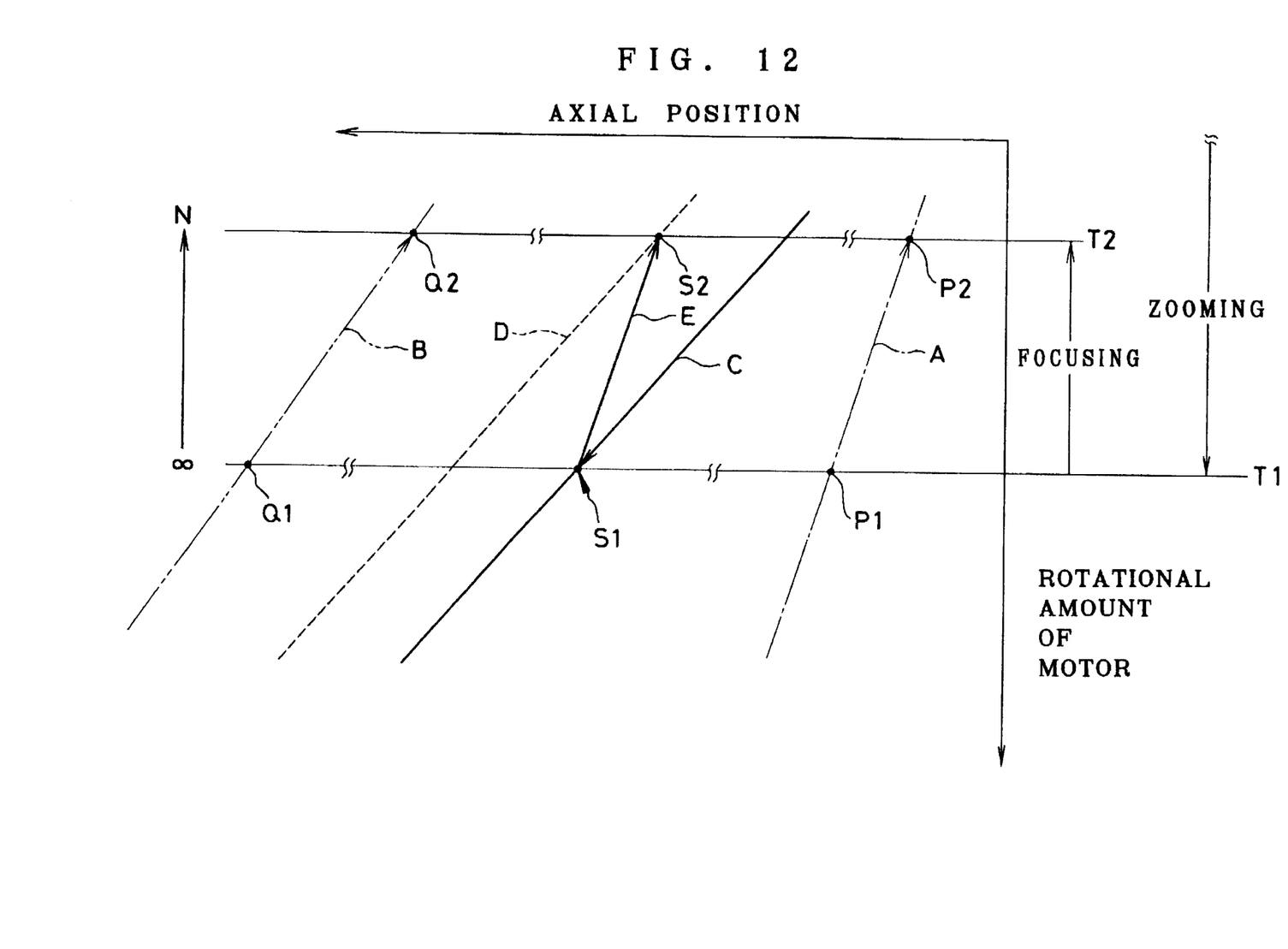
FIG. 12 is a diagram showing respective courses of the rear lens group, the intermediate barrel and the front lens group during focusing of the zoom lens of FIG. 1.

For instance, if the focusing data for the zoom lens in the position corresponding to the rotational amount T1 of the motor 41 from the rest position, designates a focusing position that corresponds to a rotational amount T2 of the motor 41 from the rest position, as shown in FIG. 12, the motor 41 is rotated reversely to move back to the position corresponding to the rotational amount T2. Thereby, the intermediate barrel 15 moves to a focusing position P2 rearward from the zooming position P1 along the same curve A as in the zooming. Also the front lens group 17 moves to a focusing position Q2 rearward from the zooming position Q1 along the same curve B as in the zooming. On the contrary, since the solenoid 44 continues being activated to secure the rear lens frame 12 to the linear motion barrel 14 from the start of focusing, the rear lens frame 12 moves back together with the linear motion barrel 14. Since the linear motion barrel 14 is immovable in the optical axis direction 22 relative to the intermediate barrel 15, the rear lens frame 12 moves by the same amount in the optical axis direction 22 as the intermediate barrel 15, so that the cam follower pin 36 is released from the urging force of the spring 34 and from the cam surface 38a as well. However, the axial movement of the rear lens frame 12 is limited by the movable range of the cam follower pin 36 in the optical axis direction 22 within the cam groove 38.

For example, assuming that a curve D shown by dashed lines in FIGS. 11 and 12 shows another limit of the movable range of the cam follower pin 36 away from the cam surface 38a, the rear lens frame 12 moves for the focusing along a curve E which is parallel to the curve A, but is different from the curve C, i.e. the zooming course of the rear lens frame 12. In this way, the rear lens frame 12 moves from the zooming position S1 to a focusing position S2 in this instance.

After the focusing of the zoom lens, the controller 50 drives the shutter unit 42 through the driver 59 to make an exposure. Upon receipt of an exposure end signal, the controller 50 turns the solenoid 44 off to release the rear lens frame 12 from the linear motion barrel 14, so that the cam follower pin 36 is brought back into contact with the cam surface 38a under the force of the spring 34.

In this embodiment, so long as the rear lens frame 12 is on the zooming course shown by the curve C, that is, so long as the cam follower pin 36 is in contact with the cam surface 38a, the focus of the zoom lens is set in an infinity range. Therefore, if the subject distance data represent the infinity range, the shutter unit 42 only is activated in response to the full-depression of the shutter button 52, without the solenoid 44 and the motor 41 being activated for focusing. On the other hand, as indicated in FIG. 12, where the rear lens frame 12 is moved to the opposite limit shown by the curve D, the focus of the zoom lens is set to a nearest range. Thus, the focus of the zoom lens changes with the reverse rotation of the motor 41 after the activation of the brake member 43.

Although the solenoid 44 of the brake member 43 is turned on upon the full-depression of the shutter button 52 in the above embodiment, it is possible to turn the solenoid 44 on immediately after the range finding upon the half-depression of the shutter button 52. In this alternative, the solenoid 44 should be turned off when the depression of the shutter button 52 is interrupted, as well as after the exposure is executed.

In the above embodiment, the front lens group 17 moves along the same curve B both for zooming and focusing, while the rear lens frame 12 follows the different course E for focusing from the course C for zooming. However, it is possible to design the rear lens frame 12 to follow the same course both for zooming and focusing, while a hindering device is provided for making the front lens group 17 take a different focusing course from the course B for zooming.

In the above embodiment, movement of the rear lens frame 12 is stopped relative to the intermediate barrel 15 during focusing by activating the brake member 43. But the rear lens frame 12 may be secured to any of those members which do not move along with the front lens group 17 during the focusing.

Although both of the front and rear lens groups are moved during focusing as is shown in FIG. 12, it is possible to move only one of the two lens groups for focusing. For example, the rear lens frame 12 may be secured to the fixed barrel 10 or the camera body 40a during focusing.

Figure 13:
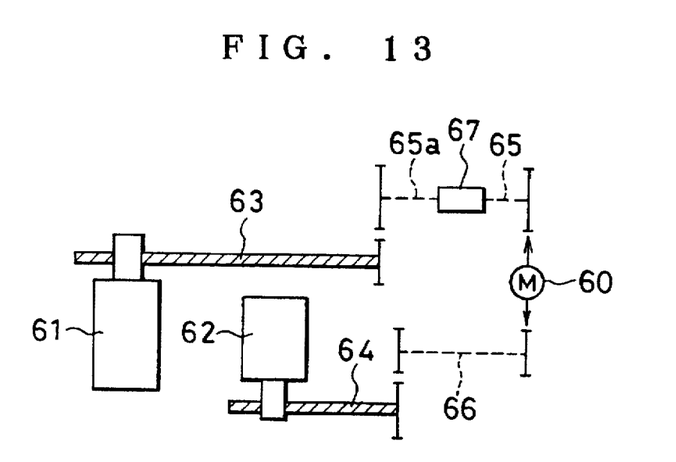
FIG. 13 is an explanatory view of a zoom lens according to another preferred embodiment of the invention wherein a hindering device disconnects power transmission from a motor to a lens group.

In an embodiment as shown in FIG. 13, two lens groups 61 and 62 are movable relative to each other through a pair of screw shafts 63 and 64 which are driven by a motor 60 through two series of gear trains 65 and 66, respectively. One 65 of the two gear trains 65 and 66 has a clutch mechanism 67 incorporated therein. During zooming, the clutch mechanism 67 is inactive so that the power of the motor 60 is transmitted to both screw shafts 63 and 64. For focusing, the clutch mechanism 67 is activated to disconnect the lens group 61 from the motor, so that the other lens group 62 only is moved. The lens group 61 may be a front or a rear lens group. The clutch mechanism 67 may be constituted of a planetary gear which is changeable between an engaged position and a disengaged position in accordance with the change of rotational direction of the motor 60.

Also the present invention is applicable to a zoom lens having more than two lens groups. In that case, at least two lens groups are moved relative to each other during zooming. And, during focusing, a hindering device sets one of these two lens groups immovable relative to the camera body or a portion of the lens barrel that does not move together with the other lens group as being moved for focusing.

As described so far, the present invention provides a hindering device which can make one of two lens groups immovable relative to the camera body or a portion of the lens barrel that does not move together with the other lens group as being moved for focusing. Therefore, the cam groove for moving and guiding the lens groups can be simple in construction.

Although the present invention has been described in detail with respect to the embodiments shown in the drawings, the present invention is not to be limited to the above embodiments but, on the contrary, various modifications of the present invention may be possible to those skilled in the art without departing from the scope of claims appended hereto.

What is claimed is:

1. A zoom lens comprising:
   a first lens group movable in an optical axis direction of the zoom lens relative to a camera body;
   a second lens group movable in the optical axis direction relative to said first lens group and said camera body;
   a lens driving device for moving said first and second lens groups for zooming as well as for focusing;
   a hindering device which is activated during focusing to hinder one of said first and second lens groups from moving in the optical axis direction relative to said camera body.

2. A zoom lens as claimed in claim 1, wherein said hindering device is a brake member is activated to secure said first lens group to a portion which is immovable in the optical axis direction relative to said camera body.

3. A zoom lens as claimed in claim 1, wherein said first and second lens groups are moved through a plurality of drive shafts which are driven by said lens driving device through a power transmission mechanism, and said hindering device is connected in said power transmission mechanism such that, during focusing, one of said two lens groups is disconnected from said lens driving device.

4. A zoom lens having at least two lens groups and a single lens driving device for moving said at least two lens groups relative to each other in an optical axis direction of said zoom lens during zooming as well as during focusing, said zoom lens comprising:
   a hindering device which is activated during focusing to hinder a first one of said two lens groups from moving in the optical axis direction relative to a first lens barrel portion which moves differently from a second one of said two lens groups.

5. A zoom lens as claimed in claim 4, wherein during zooming said first lens group is guided along a cam surface and, during focusing when said hindering device is activated, said first lens group is released from said cam surface to move by the same amount in the optical axis direction as said first lens barrel portion.

6. A zoom lens as claimed in claim 5, further comprising a cam groove provided in said first lens barrel portion, a cam follower member which is secured to said first lens group and is engaged in said cam groove, an urging member for urging said cam follower member into contact with a side wall of said cam groove, and a guide member for guiding said first lens group to move in the optical axis direction, wherein said cam surface is formed by said side wall of said cam groove.

7. A zoom lens as claimed in claim 6, wherein said second lens group is fixedly mounted in a second lens barrel portion which is connected to said first lens barrel portion through helicoid screws such that said first and second lens barrel portions move by different amounts in the optical axis direction when said first lens barrel portion is rotated by said lens driving device.

8. A zoom lens as claimed in claim 7, wherein said cam groove has a helicoid portion so that the axial position of said first lens group is defined by the axial position of said cam groove within said first lens barrel portion and the amount of axial movement of said first lens barrel portion.

9. A zoom lens as claimed in claim 8, further comprising a third lens barrel portion which is coupled to said first lens barrel portion to be rotatable relative to said first lens barrel portion but immovable in the optical axis direction relative to said first lens portion, wherein said hindering device is a brake member which secures said first lens group to said first lens barrel portion or said third lens barrel portion, when activated by an actuator.

10. A zoom lens comprising:
   a first lens group movable in an optical axis direction of the zoom lens relative to a camera body;
   a second lens group movable in the optical axis direction relative to said first lens group and said camera body;
   a zooming signal generating device for generating a zooming signal;
   a focusing data generating device for generating focusing data based on said zooming signal and subject distance data;
   a lens driving device for moving said first and second lens groups;
   a control device for controlling said lens driving device in accordance with said zooming signal or said focusing data; and
   a hindering device which is activated by said control device while said control device controls the lens driving device in accordance with said focusing data, so as to hinder said first lens group from moving in the optical axis direction relative to the camera body or a lens barrel portion which is moved in the optical axis direction relative to said second lens group as said second lens group is moved by said lens driving device, wherein said first lens group is guided along a cam surface unless said hindering device is activated, and is released from said cam surface after said hindering device is activated.

11. A zoom lens comprising:

a fixed barrel to be fixedly attached to a camera body;

an intermediate barrel coupled to said fixed barrel through helicoid screws;

a movable barrel coupled to said intermediate barrel through helicoid screws;

a front lens group fixedly held in said movable barrel;

a rear lens group held between said movable barrel and said intermediate barrel so as to be movable in an optical axis direction of the zoom lens relative to said barrels;

a cam surface formed in an inner periphery of said intermediate barrel to guide said rear lens group along during zooming;

a lens driving device for rotating said intermediate barrel for zooming as well as for focusing; and a hindering device which is activated during focusing to hinder said rear lens group from moving in the optical axis direction relative to said intermediate barrel, so that said rear lens group moves by the same amount in the optical axis direction as said intermediate barrel independently of said cam surface.

* * * * *